United States Patent
Jung et al.

(10) Patent No.: US 10,375,706 B2
(45) Date of Patent: Aug. 6, 2019

(54) DEVICE-TO-DEVICE (D2D) DATA TRANSMISSION METHOD OF USER EQUIPMENT IN WIRELESS COMMUNICATION SYSTEM AND USER EQUIPMENT USING SAME METHOD

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 25 days.

(21) Appl. No.: 15/519,445

(22) PCT Filed: Oct. 16, 2015

(86) PCT No.: PCT/KR2015/010989
§ 371 (c)(1),
(2) Date: Apr. 14, 2017

(87) PCT Pub. No.: WO2016/060524
PCT Pub. Date: Apr. 21, 2016

(65) Prior Publication Data
US 2017/0245295 A1 Aug. 24, 2017

Related U.S. Application Data

(60) Provisional application No. 62/064,988, filed on Oct. 16, 2014, provisional application No. 62/076,486, (Continued)

(51) Int. Cl.
*H04W 72/10* (2009.01)
*H04W 28/02* (2009.01)
(Continued)

(52) U.S. Cl.
CPC ........... *H04W 72/10* (2013.01); *H04W 28/02* (2013.01); *H04W 72/1242* (2013.01);
(Continued)

(58) Field of Classification Search
CPC ..... H04W 28/02; H04W 72/10; H04W 24/00; H04W 36/14; H04W 72/12; H04W 72/1242; H04W 88/06; H04W 8/005
See application file for complete search history.

(56) References Cited

U.S. PATENT DOCUMENTS

2012/0302272 A1  11/2012  Hakola et al.
2015/0163790 A1*  6/2015  Lee ..................... H04L 1/0025
                                                    370/329

(Continued)

FOREIGN PATENT DOCUMENTS

KR   10-2010-0134034 A   12/2010
KR   10-2013-0048709 A   5/2013
WO   WO 2014/148835 A1   9/2014

OTHER PUBLICATIONS

3GPP TS 36.304 V8.5.0 (Mar. 2009), Technical Specification, 3rd Generation Partnership Project; Technical Specification Group Radio Access Network; Evolved Universal Terrestrial Radio Access (E-UTRA); User Equipment (UE) procedures in idle mode (Release 8), 30 pgs.

(Continued)

*Primary Examiner* — Steven H Nguyen
(74) *Attorney, Agent, or Firm* — Birch, Stewart, Kolasch & Birch, LLP

(57) ABSTRACT

Disclosed are a device-to-device (D2D) data transmission method of a user equipment (UE) in a wireless communication system and a UE using the method. The method comprises: receiving multiple resource pools and a resource pool configuration for configuring priority order information on each resource pool; and selecting a particular resource (Continued)

pool to transmit D2D data among the multiple resource pools on the basis of the priority order information on each resource pool, wherein the priority order information on each resource pool indicates the priority order of D2D data capable of using each of the multiple resource pools.

6 Claims, 19 Drawing Sheets

Related U.S. Application Data filed on Nov. 7, 2014, provisional application No. 62/145,459, filed on Apr. 9, 2015.

(51) Int. Cl.
*H04W 72/12* (2009.01)
*H04W 8/00* (2009.01)
*H04W 36/14* (2009.01)
*H04W 88/06* (2009.01)

(52) U.S. Cl.
CPC ............ *H04W 8/005* (2013.01); *H04W 36/14* (2013.01); *H04W 88/06* (2013.01)

(56) References Cited

U.S. PATENT DOCUMENTS

| | | | |
|---|---|---|---|
| 2015/0382324 A1* | 12/2015 | Sheng .................... | H04W 72/02 370/329 |
| 2016/0219640 A1* | 7/2016 | Jung ...................... | H04W 72/02 |
| 2016/0302215 A1* | 10/2016 | Sorrentino .......... | H04W 76/023 |
| 2016/0323869 A1* | 11/2016 | Xu ..................... | H04W 72/0473 |
| 2017/0171837 A1* | 6/2017 | Chen ..................... | H04W 72/04 |
| 2017/0230939 A1* | 8/2017 | Rudolf ................. | H04W 72/04 |
| 2017/0347339 A1* | 11/2017 | Yasukawa ............. | H04W 72/04 |

OTHER PUBLICATIONS

CATT, "On D2D communication", R1-131897, 3GPP TSG RAN WG1 Meeting #73, Fukuoka, Japan, May 20-24, 2013, 8 pgs.

* cited by examiner

DEVICE-TO-DEVICE (D2D) DATA TRANSMISSION METHOD OF USER EQUIPMENT IN WIRELESS COMMUNICATION SYSTEM AND USER EQUIPMENT USING SAME METHOD

CROSS REFERENCE TO RELATED APPLICATIONS

This application is the National Phase of PCT International Application No. PCT/KR2015/010989, filed on Oct. 16, 2015, which claims priority under 35 U.S.C. 119(e) to U.S. Provisional Application No. 62/064,988, filed on Oct. 16, 2014, No. 62/076,486, filed on Nov. 7,2014 and No. 62/145,459, filed on Apr. 9, 2015, all of which are hereby expressly incorporated by reference into the present application.

BACKGROUND OF THE INVENTION

Field of the Invention

The present invention relates to wireless communications, and more particularly, relates to a method for transmitting D2D data performed by a terminal in a wireless communication system and a terminal using the method.

Related Art

In an International Telecommunication Union Radio communication sector (ITU-R), a standardization of International Mobile Telecommunication (IMT)-Advanced, which is a next generation mobile communication system after the third generation, has been progressed. The IMT-Advanced is aimed at supporting an Internet Protocol (IP) based multimedia service with a data transmission rate of 1 Gbps in a stop and low speed moving state and a data transmission rate of 1 Gbps in a high speed moving state.

3rd Generation Partnership Project (3GPP) is preparing LTE-Advanced (LTE-A) that improves the Long Term Evolution (LTE) based on an Orthogonal Frequency Division Multiple Access (OFDMA)/Single Carrier-Frequency Division Multiple Access (SC-FDMA) transmission scheme as a system standard satisfying the requirements of IMT-Advanced. The LTE-A is one of the important candidates for IMT-Advanced.

In recent years, there is growing interest in a Device-to-Device (D2D) technology that performs a direct communication between devices. In particular, the D2D is attracting attention as a communication technology for a public safety network. A commercial communication network has been rapidly changed to the LTE but a current public safety network is based on a 2G technology in the aspect of a collision problem with an existing communication standard and a cost. The Request for the technology clearance and an improved service leads to an effort to improve the public safety network.

The public safety network has high service requirements (reliability and security) as being compared with the commercial communication network. In particular, even in the case that the coverage of cellular communication is insufficient or unavailable, there is a need for a direct signal transmission and reception between devices, that is, a D2D operation.

The D2D operation may have various advantages in the fact that the D2D operation is a signal transmission/reception between neighboring devices. For example, a D2D terminal may perform a data communication with a high transmission rate and low delay. Further, the D2D operation may distribute a traffic converged in a base station. In the case that the D2D terminal serves as a relay, the D2D terminal may play the role of extending the coverage of a base station.

Meanwhile, a network may configure a plurality of resource pools that a terminal may transmit a D2D signal, for example, a data (D2D data) according to the D2D operation. In this case, a method may be required for determining which resource pool a terminal uses among the plurality of resource pools.

For example, assuming that there are a first terminal that is going to perform a D2D operation for the public safety and a second terminal that is going to perform a D2D operation for a general data transmission, the case may be required that the first terminal has higher priority between the terminals and performs more reliable D2D communication. Accordingly, a D2D data transmission method and a terminal for it are required.

SUMMARY OF THE INVENTION

An object of the present invention is to provide a method for transmitting D2D data performed by a terminal in a wireless communication system and a terminal using the method.

In an aspect, a method for transmitting device-to-device (D2D) data performed by a user equipment (UE) in a wireless communication system is provided. The method comprises receiving a resource pool configuration that configures priority information for a plurality of resource pools and each resource pool and selecting a specific resource pool for transmitting D2D data among the plurality of resource pools based on the priority information for each resource pool, wherein the priority information for each resource pool indicates a priority of the D2D data for using each of the plurality of resource pools.

The specific resource pool may be selected based on the priority of the D2D data and the priority information for each resource pool.

When the D2D data that the UE is going to transmit include a plurality of packets, at least two packets among the plurality of packets may have different priorities.

The resource pool for transmitting each packet may be selected based on a priority of each of the plurality of packets and the priority for each resource pool.

The priority information for each resource pool may indicate an access class of a UE or a UE group that is available to use each resource pool.

In another aspect, a user equipment (UE) is provided. The UE comprises a radio frequency (RF) unit configured to transmit or receive a radio signal and a processor operatively connected to the RF unit, wherein the processor is configured to perform: receiving a resource pool configuration that configures priority information for a plurality of resource pools and each resource pool and selecting a specific resource pool for transmitting D2D data among the plurality of resource pools based on the priority information for each resource pool, wherein the priority information for each resource pool indicates a priority of the D2D data for using each of the plurality of resource pools.

Advantageous Effects

According to the present invention, by considering a priority of a terminal, more particularly, a priority of D2D data that the terminal is going to transmit and a priority of each resource pool, a proper resource pool may be selected.

DESCRIPTION OF EXEMPLARY EMBODIMENTS

Figure 1:
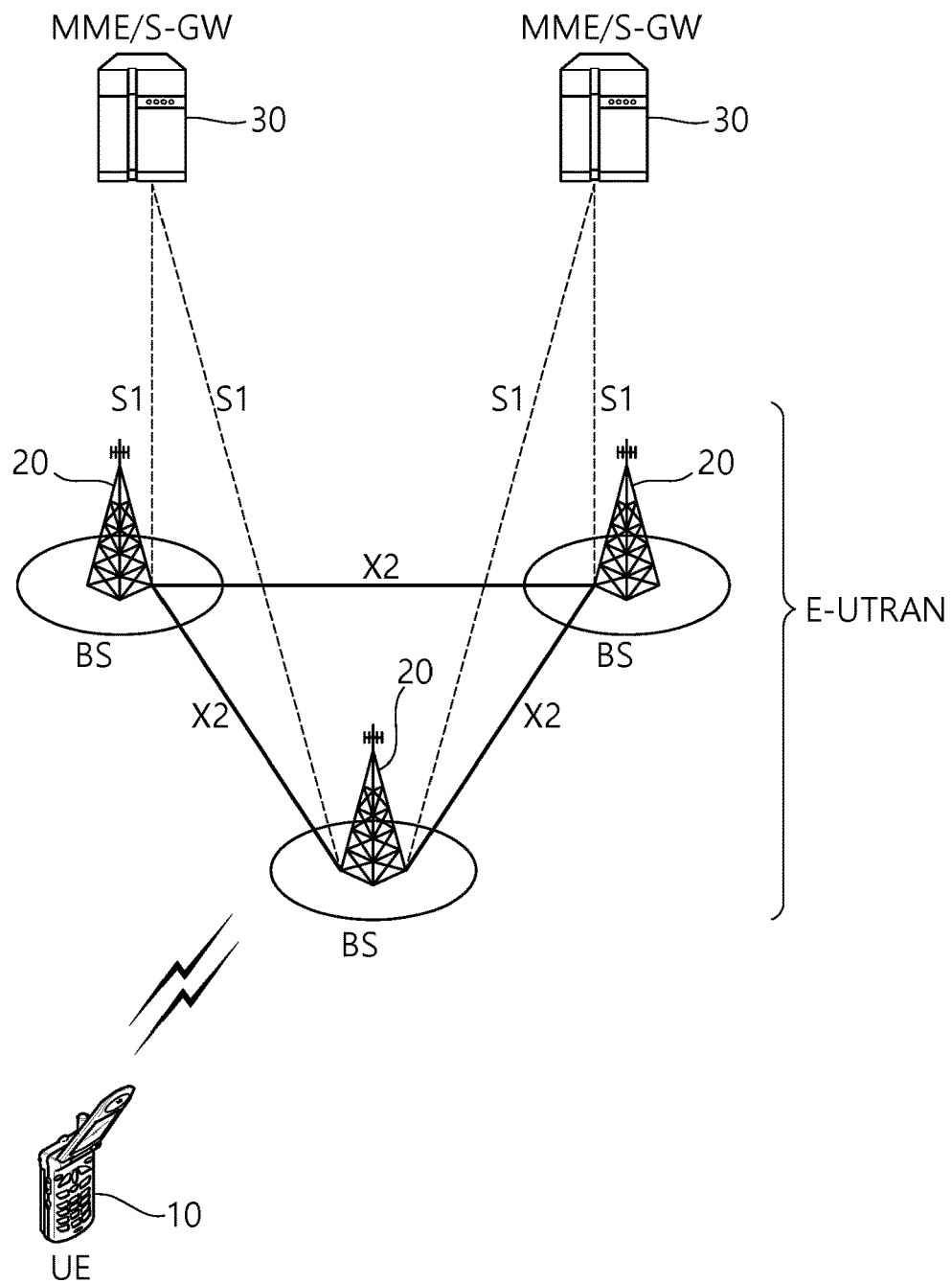
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
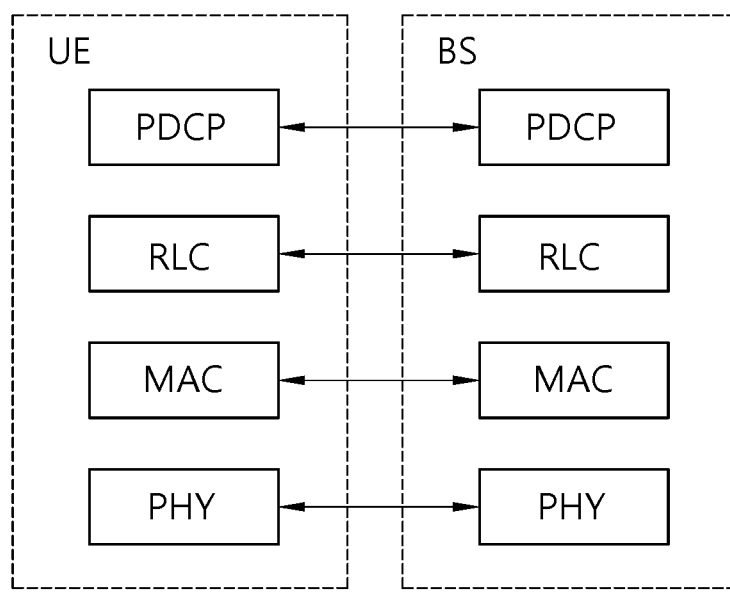
FIG. 2 is a diagram showing a wireless protocol architecture for a user plane.
Figure 3:
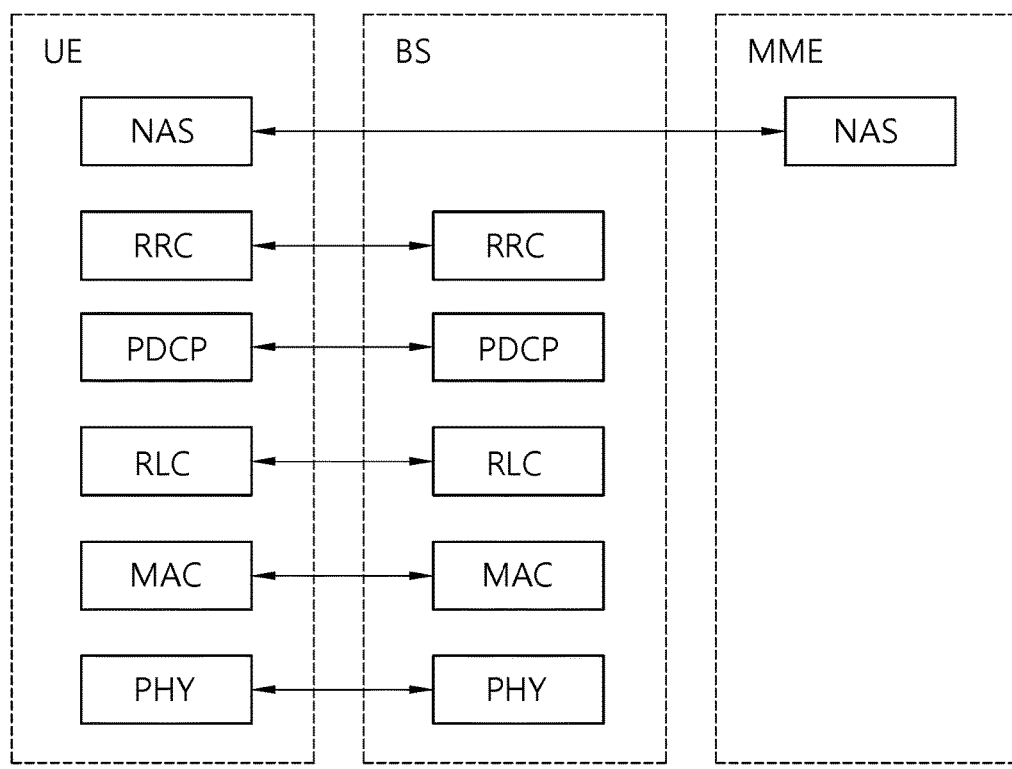
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
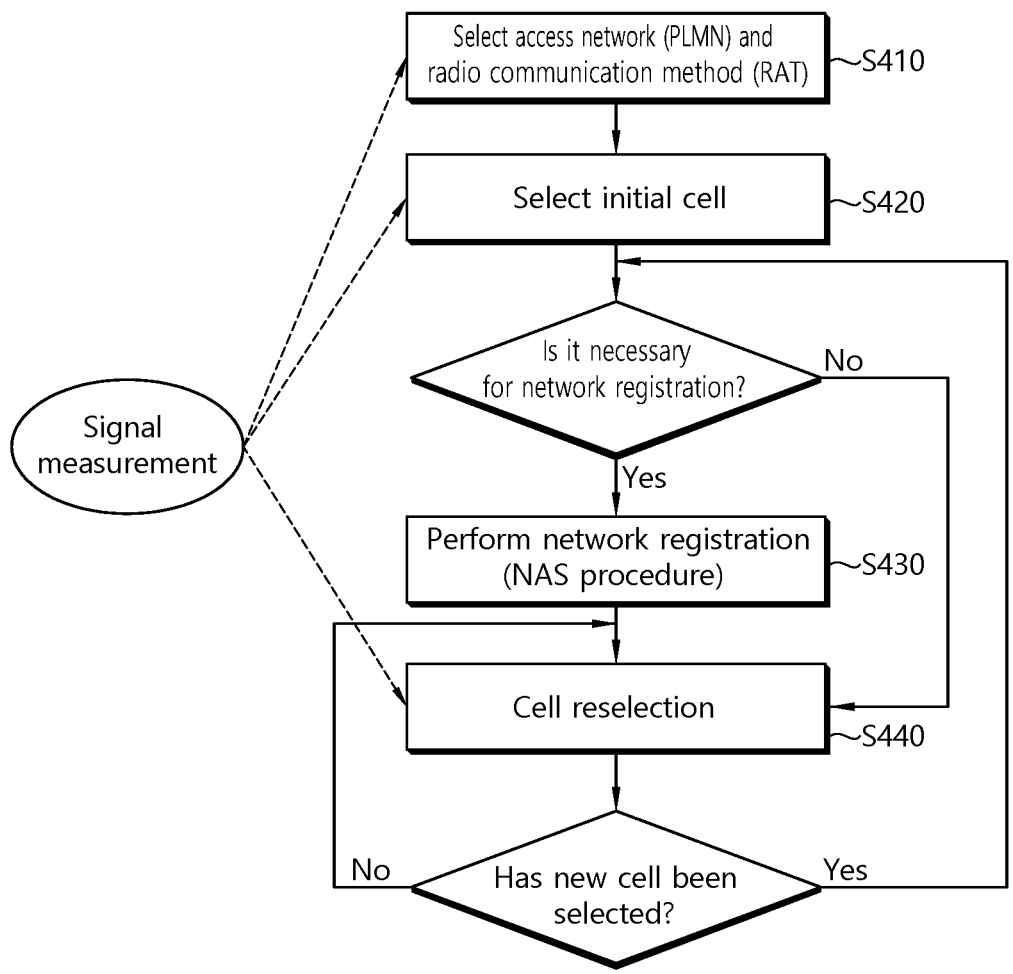
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
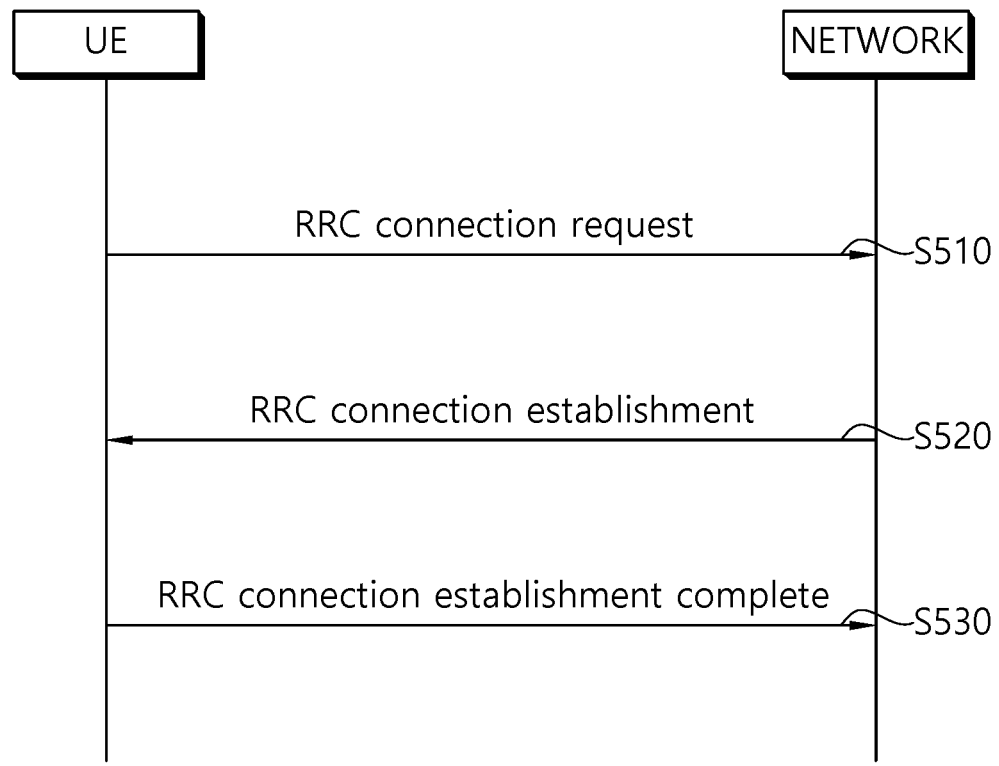
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
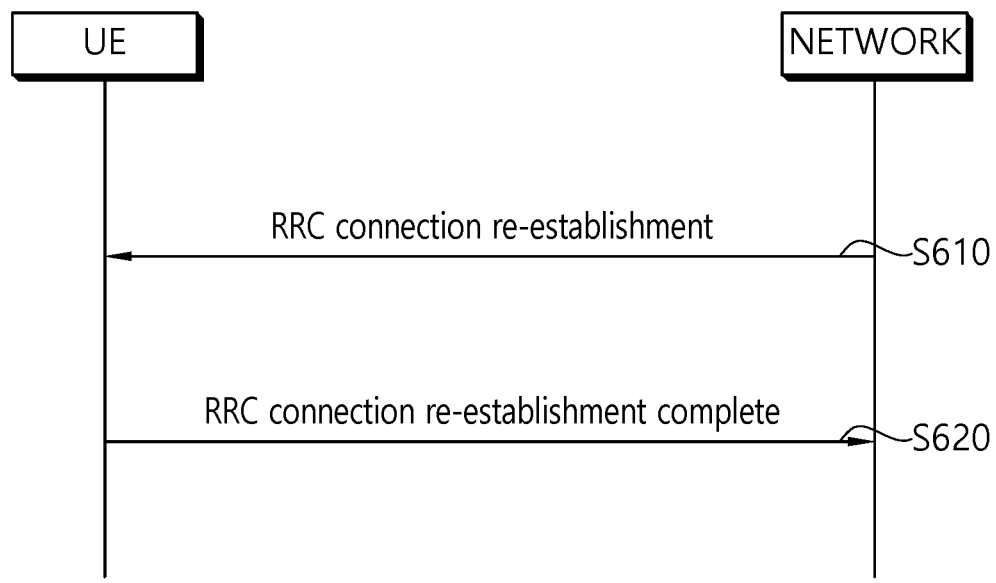
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$\text{Srxlev} > 0 \text{ AND Squal} > 0, \qquad [\text{Equation 1}]$$

where:

$$\text{Srxlev} = Q_{rxlevmeas} - (Q_{rxlevmin} + Q_{rxlevminoffset}) - P_{compensation},$$

$$\text{Squal} = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

- A case where UE determines that there is a serious problem in the quality of a downlink communication link (a case where the quality of a PCell is determined to be low while performing RLM) based on the radio quality measured results of the PHY layer of the UE
- A case where uplink transmission is problematic because a random access procedure continues to fail in the MAC sublayer.
- A case where uplink transmission is problematic because uplink data transmission continues to fail in the RLC sublayer.
- A case where handover is determined to have failed.
- A case where a message received by UE does not pass through an integrity check.

An RRC connection re-establishment procedure is described in more detail below.

Figure 7:
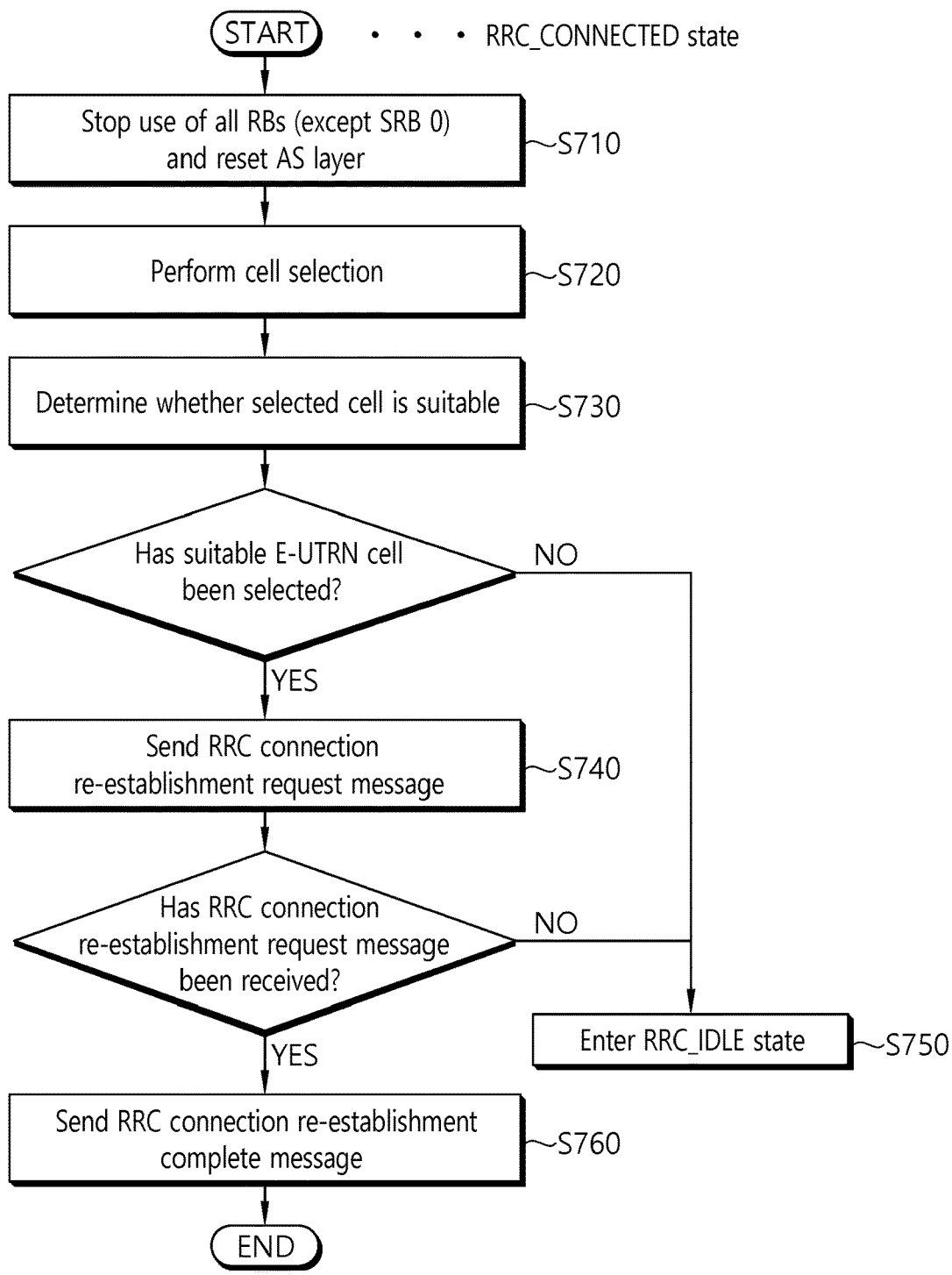
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
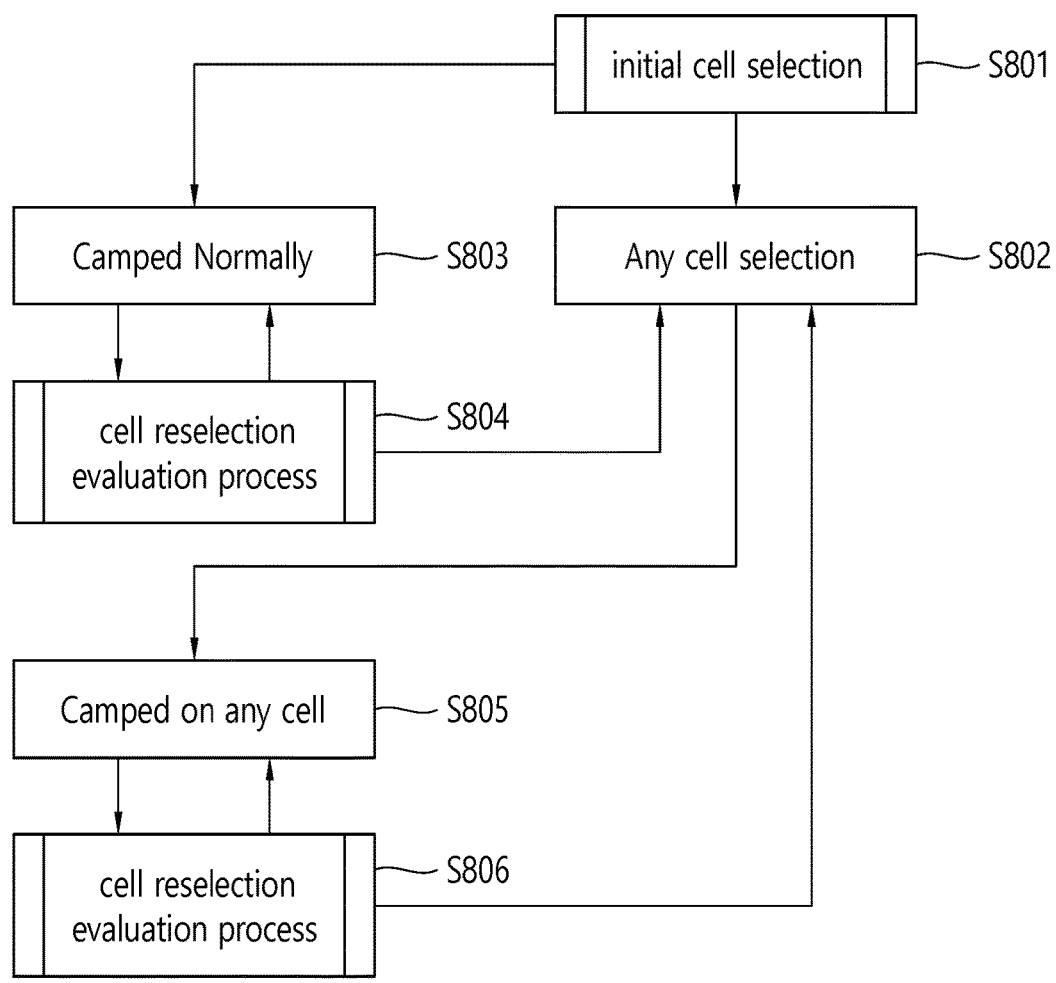
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
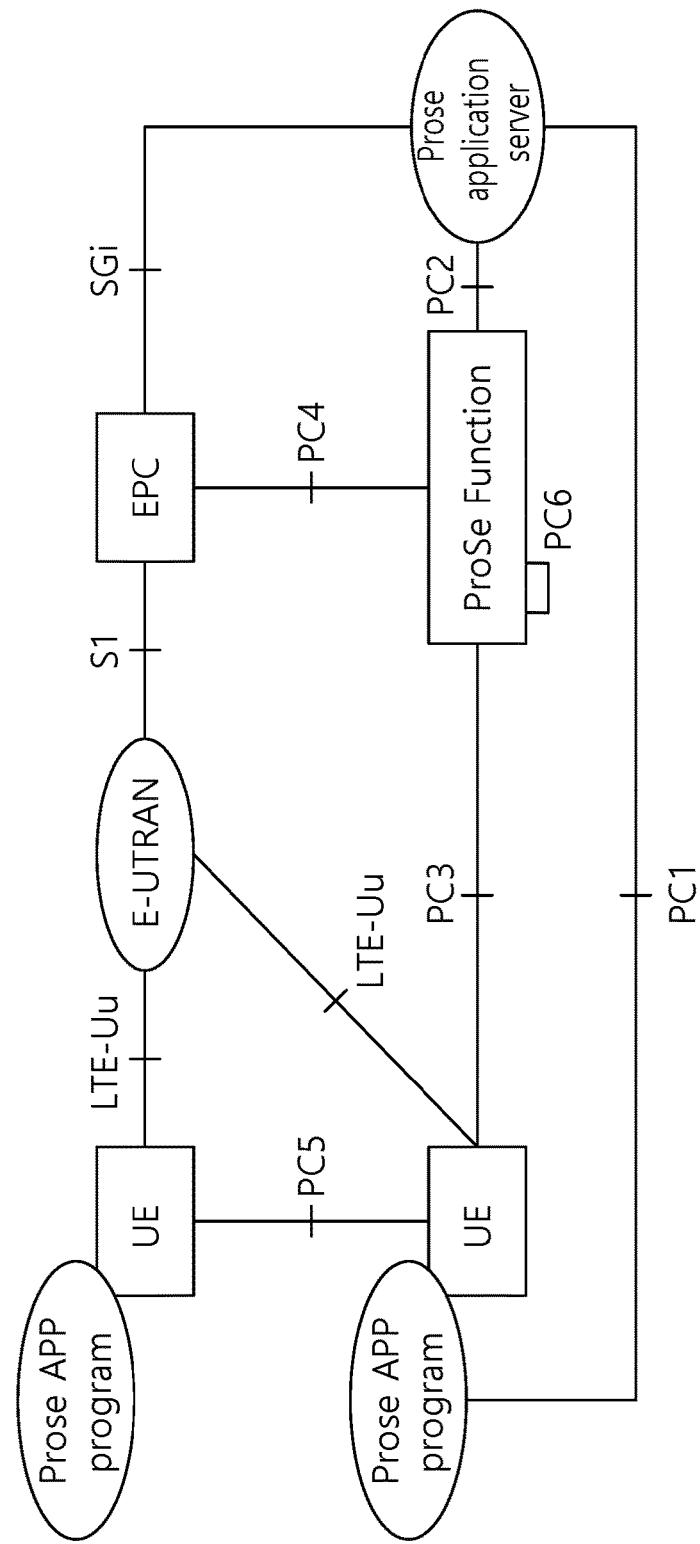
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe direct communication (D2D communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
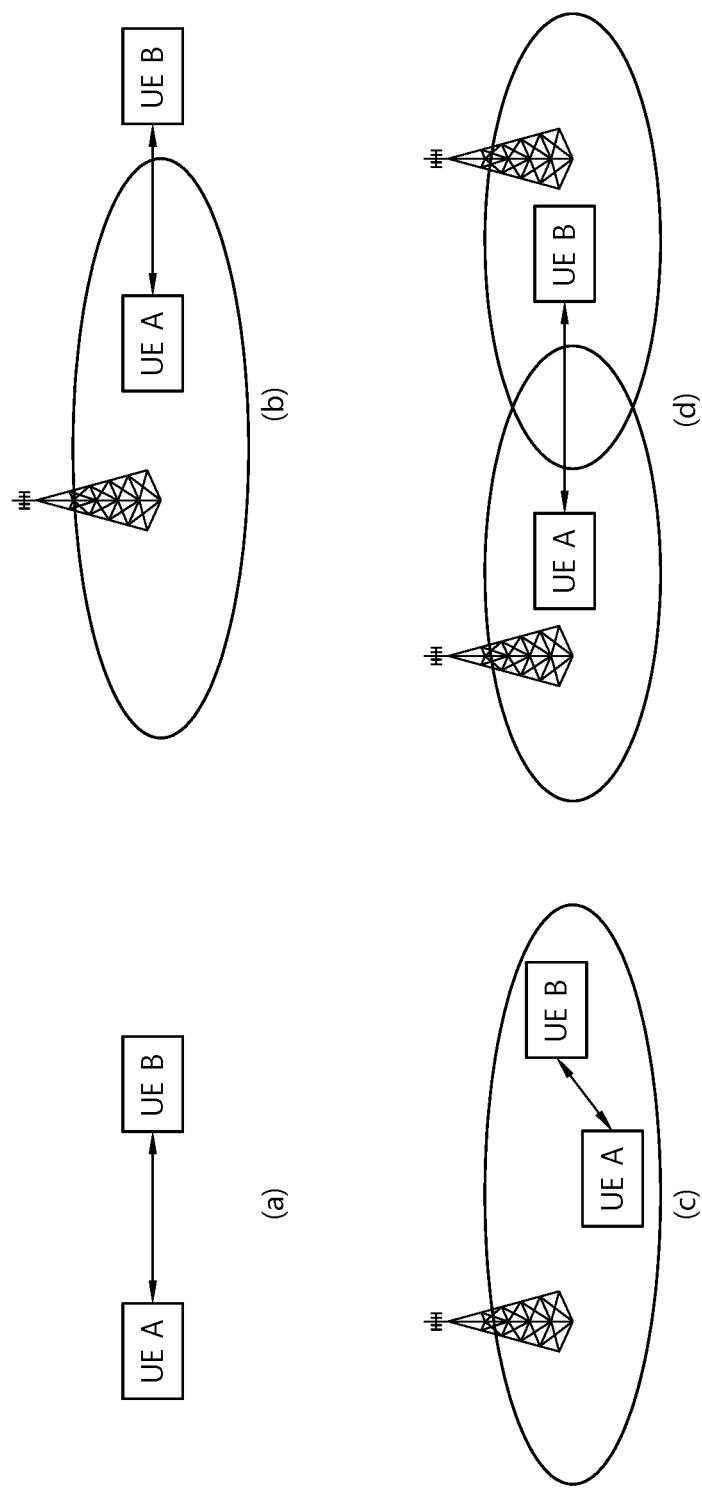
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
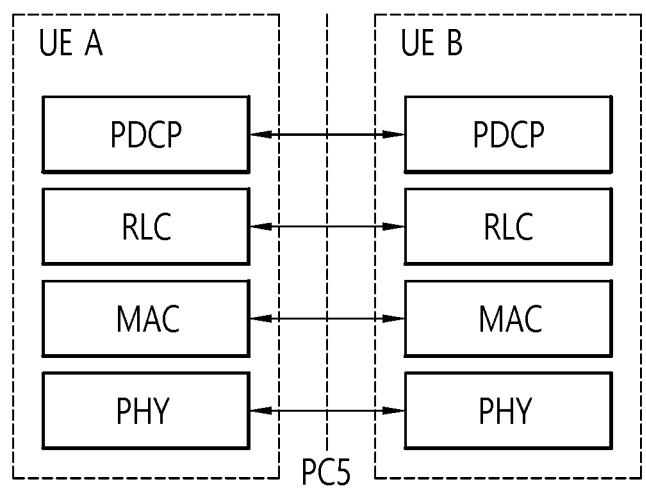
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio resource assignment for ProSe direct communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
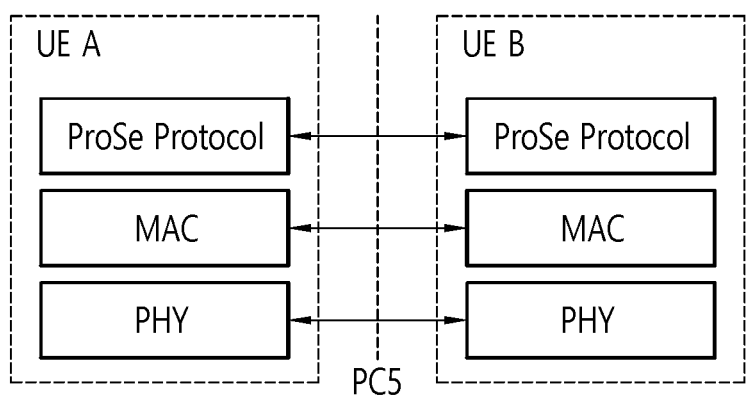
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol.

An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Figure 13:
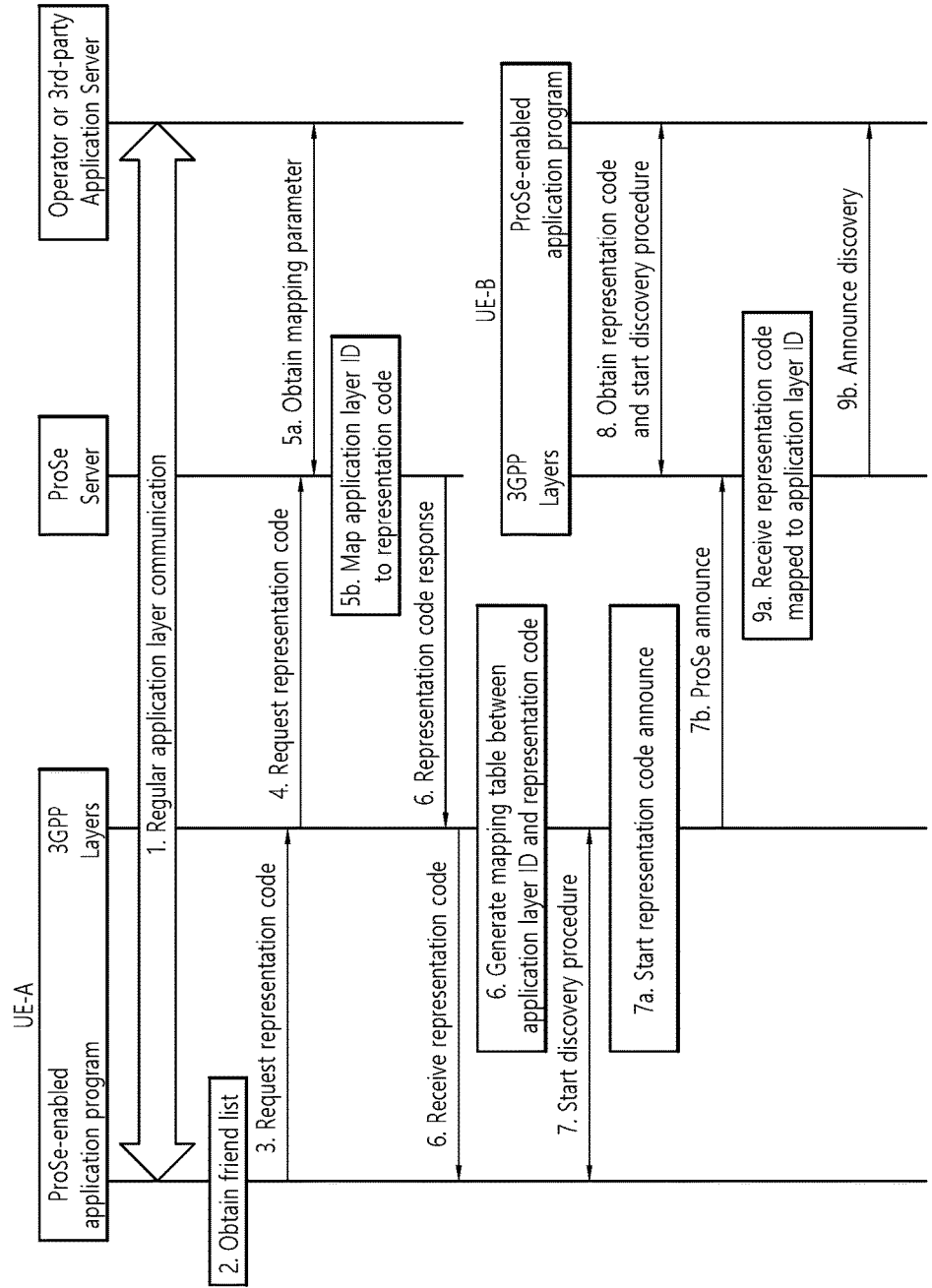
FIG. 13 illustrates an embodiment of a ProSe direct discovery procedure.

FIG. 13 illustrates an embodiment of a ProSe direct discovery procedure.

Referring to FIG. 13, it is assumed in a terminal A and a terminal B that a ProSe-enabled application program is operated, and the terminal A and the terminal B are configured in a friend relationship to each other, that is, a relationship capable of allowing D2D communication with each other in the application program. Hereinafter, the terminal B may be expressed as a friend of the terminal A. For example, the application program may be a social networking program. 3GPP Layers correspond to functions of an application program for using a ProSe discovery service regulated according to 3GPP.

A ProSe direct discovery between the terminal A and the terminal B may perform a following procedure.

1. First, the terminal A performs regular application-Layer communication with an application server. The above communication is performed based on Application programming interface (API).

2. A ProSe enabled application program of the terminal A receives a list of application layer IDs having a friend relationship. The application layer ID may generally be in the form of a network access ID. For example, an application layer ID of the terminal A may have a form such as adam@example.com.

3. A terminal A requests private expression codes for a user and private expression codes for a friend of the user.

4. 3GPP layers transmit an expression code request to a ProSe server.

5. The ProSe server map application layer IDs provided from an operator or a third application server to private expression codes. For example, an application layer ID such as adam@example.com. The mapping may be performed based on parameters (e.g., mapping algorithms, key values, and the like) received from an application service of the network.

6. The ProSe server responds the obtained expression codes to the 3GPP layers. The 3GPP layers report that expression codes with respect to the requested application layer are successively received to the ProSe enabled application program. Further, a mapping table between the application layer IDs and the expression codes are generated.

7. The ProSe enabled application program requests the 3GPP layers to start the discovery procedure. That is, when one of friends is located close to the terminal A and direct communication may be performed, the ProSe enabled application program attempts the discovery. 3GPP layers announce a private expression code of the terminal A (that is, "GTER543$#2FSJ67DFSF" which is a private expression code of adam@example.com in the above example). In mapping of an application layer ID of a corresponding application program and the private expression code, the mapping relationship may be known by the previously received friends, and the mapping may be performed.

8. It is assumed that the terminal B is operating the same ProSe enabled application program as that of the terminal A, and the above steps 3 to 6 may be executed. 3GPP layers included in the terminal B may perform ProSe discovery.

9. When the terminal B receives the above announce from the terminal A, the terminal B determines whether the private expression code included in the announce is known by the terminal B or is mapped to an application layer ID. As illustrated in step 8, since the terminal B performs steps 3 to 6, the terminal B knows a private expression code with respect to the terminal A, mapping of the private expression code to the application layer ID, and which is a corresponding application program. Accordingly, the terminal B may discover the terminal B from the announce of the terminal A. The 3GPP layers in the terminal B announces that adam@example.com is discovered to the ProSe enable application program.

FIG. 13 illustrates a discovery procedure by taking into consideration the terminals A and B, the ProSe server, and the application server. Only an operation side between the terminals A and B is described. The terminal A transmits a signal called the announce (the procedure may refer to announcement), and the terminal B receives the announce to discover the terminal A. That is, a discovery procedure of FIG. 13 in an operation directly related to another terminal among operations performed by each terminal may refer to a single step discovery procedure may refer to a single step discovery procedure in a side of one step.

Figure 14:
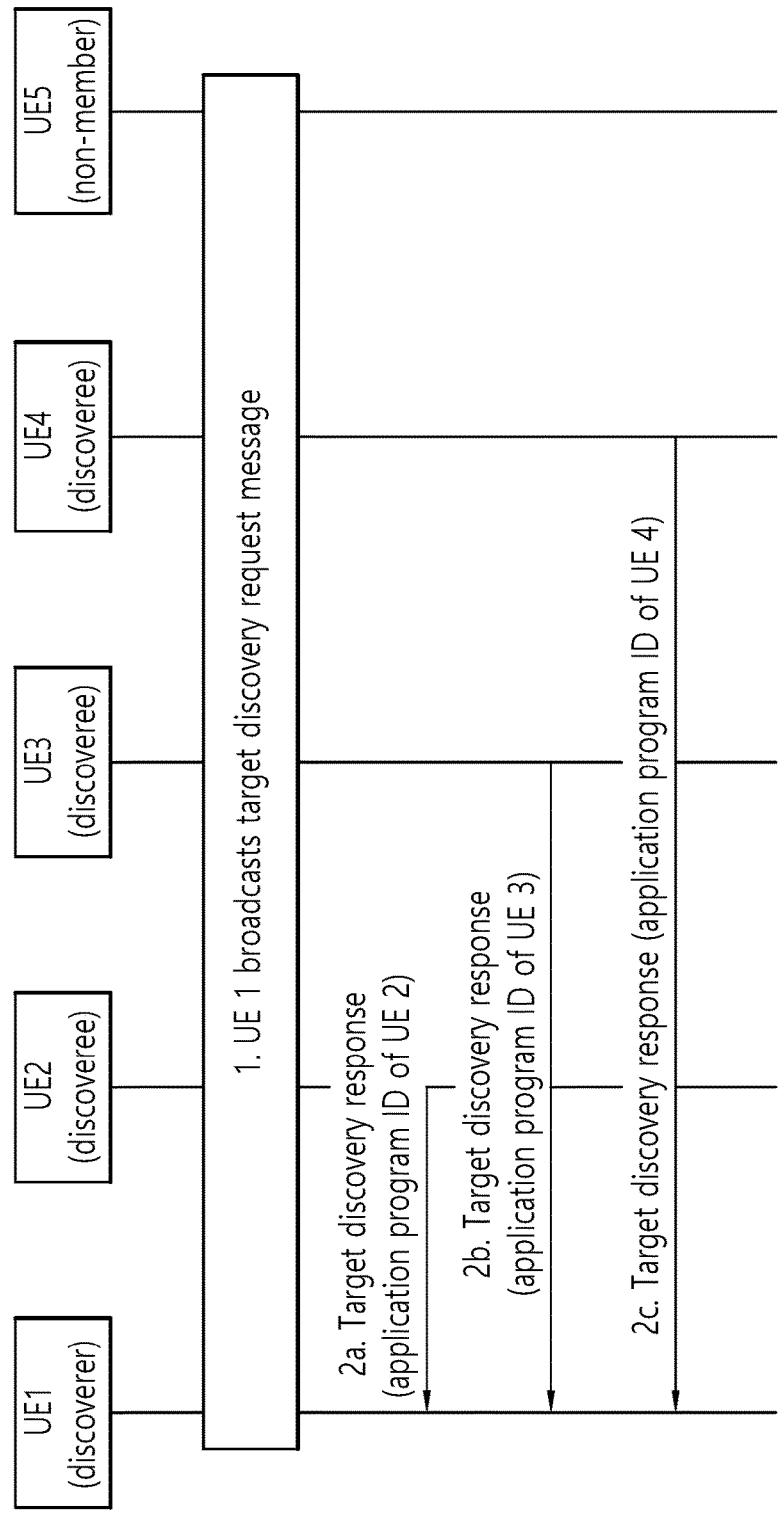
FIG. 14 illustrates another embodiment of a ProSe direct discovery procedure.

FIG. 14 illustrates another embodiment of a ProSe direct discovery procedure.

In FIG. 14, it is assumed that the terminal 1 to the terminal 4 may be included in a specific group communication system enablers (GCSE) group. It is assumed that the terminal 1 is a discoverer and terminals 2, 3, and 4 are a discoveree. A terminal 5 is a terminal regardless of a discovery procedure.

The terminal 1 and the terminals 2 to 4 may perform a following operation in a discovery procedure.

First, the terminal 1 broadcasts a targeted discovery request message (hereinafter referred to 'discovery request message' or 'M1') in order to discover whether an optional terminal included in the GCSE group is located around the terminal 1. The targeted discovery request message may include a unique application program group ID or a layer-2 group ID of the specific GCSE group. Further, the targeted discovery request message may include a unique ID of the terminal 1, that is, an application program private ID. The targeted discovery request message may be received by the terminals.

The terminal 5 transmits no response messages. The terminals 2, 3, and 4 included in the GCSE group transmit a targeted discovery response message (hereinafter referred to as a discovery response message or M2) as a response to the targeted discovery request message. The targeted discovery response message may include a unique application program private ID of a terminal transmitting the message.

An operation of terminals in a ProSe discovery procedure illustrated in FIG. 14 will be described. A discoverer (UE 1) transmits the targeted discovery request message, and receives a targeted discovery response message being a response thereto. In addition, if a discoveree (e.g., UE 2) receives the targeted discovery request message, the discoveree transmits a targeted discovery response message as a response thereto. Accordingly, each terminal performs an operation a second step. In the above side, a ProSe discovery procedure of FIG. 14 may refer to a discovery procedure.

In addition to the discovery procedure illustrated in FIG. 14, if the terminal 1 (discoverer) transmits a discovery confirm message (hereinafter may refer to M3) as a response to the targeted discovery response message, this may refer to a third step discovery procedure.

Now, the present invention will be described.

A network may provide a list of D2D resource pools to a UE. The resource pool may be a D2D transmission resource pool that may be used for a transmission of a D2D signal. For example, the resource pool may be the D2D transmission resource pool that may perform a D2D transmission based on LTE. A UE may transmit a D2D signal by selecting a specific resource in the resource pool by the UE itself. As such, a method for efficiently selecting a D2D resource pool (hereinafter, may be referred to as a resource pool, simply) will be described in the case that a plurality of D2D resource pools are provided.

Figure 15:
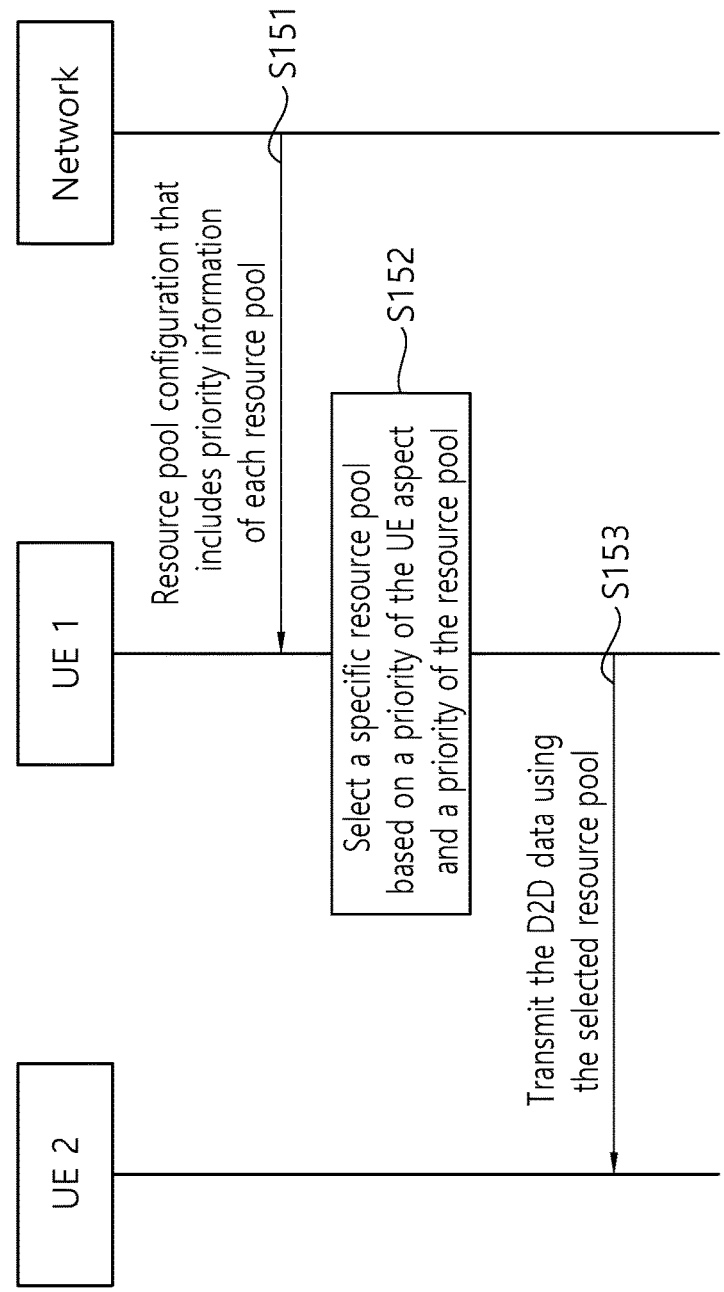
FIG. 15 illustrates a D2D operation method performed by a UE according to an embodiment of the present invention.

FIG. 15 illustrates a D2D operation method performed by a UE according to an embodiment of the present invention.

Referring to FIG. 15, a network provides a resource pool configuration that includes priority information of each resource pool to UE 1 (step, S151). The resource pool configuration may configure a plurality of resource pools to a UE, and may provide the priority information for each resource pool.

The priority information of each resource pool may be provided in the form of an index. That is, for each resource pool, the network may provide an index.

For example, assuming that the resource pools provided by the network through the resource pool configuration are resource pools 1, 2 and 3, in this case, the network indicates the priority that may be applied to each of the resource pools 1, 2 and 3 to UE 1 through the priority information of each resource pool. In this case, the priority may indicate on which group of UEs or which transmission data may use the corresponding resource pool as well as which resource pool has higher priority among resource pools 1, 2 and 3. The transmission data may be the D2D data transmitted by the D2D operation. The priority information for each resource pool may be used for indicating the priority of the D2D data that may use each of the plurality of resource pools.

For example, assuming that the priority of resource pool 1 is n, the priority of resource pool 2 is m and the priority of resource pool 3 is k, in this case, the priority n, m and k may represent the relative priority between resource pools 1, 2 and 3, but also represent the priority of UE/UE group/transmission data that may use each of resource pools 1, 2 and 3. For example, when there is a plurality of transmission data and a priority is allocated for each transmission data, the priority of a specific transmission resource pool may represent the priority of the transmission data that may use the specific transmission resource pool.

The network may provide the resource pool and the corresponding index through the system information.

The table below represents an example of the system information that indicates the resource pool and the index.

TABLE 2

ProseCommConfig information element

```
--ASN1START
ProseCommConfig-r12 ::=            Sequence            {
        commTxResources-r12                                                CHOICE {
                release                                                            NULL,
                setup                                                              CHOICE    {
                        scheduled-r12                                              SEQUENCE {
                                sl-RNTI-r12                                                         C-RNTI,
                                bsr-Config-r12                                             ProseBSR-Config-r12
                                commTxConfig-r12
                ProseCommResourcePool-r12,
                                msc-r12
                INTEGER (0 . . 28)                           OPTIONAL       -- Need OP
                        },
                        ue-Selected-r12                                            SEQUENCE
        {
                                -- Pool for normal usage
                                commTxPoolNormalDedicated-r12 SEQUENCE {
                                        poolToReleaseList-r12
                ProseTxPoolToReleaseList-r12    OPTIONAL,              -- Need ON
                                        poolToAddModList-r12
                ProseCommTxPoolToAddModList-r12    OPTIONAL             -- Need ON
                                }
                        }
                }
        }
                                        OPTIONAL,       -- Need ON
        . . .
}
ProseCommTxPoolToAddModList-r12 ::=               SEQUENCE (SIZE (1..maxProseTxPool-r12) )
OF ProseCommTxPoolToAddMod-r12
ProseCommTxPoolToAddMod-r12 ::=                    SEQUENCE            {
        poolIdentity-r12                                                   ProseTxPoolIdentity-r12,
        pool-r12
        ProseCommResourcePool-r12
}
```

TABLE 2-continued

ProseCommConfig information element

```
ProseBSR-Config-r12 ::=            SEQUENCE        {
        periodicBSR-Timer                                    ENUMERATED {
            sf5, sf10, sf16, sf20, sf32, sf40, sf64, sf80,
            sf128, sf160, sf320, sf640, sf1280, sf2560,
            infinity, spare1},
        retxBSR-Timer                                        ENUMERATED {
            sf320, sf640, sf1280, sf2560, sf5120,
            sf10240, spare2, spare1}
}
ASN1STEP
```

In Table 2 above, 'ProseCommConfig' defines the dedicated configuration information for a ProSe direct communication (D2D communication), and particularly, is in relation to a transmission resource configuration for the D2D communication in a primary frequency.

In Table 2, 'ProseCommResourcePool' may indicate a plurality of resource pools for the D2D communication, and may include the configuration information for each resource pool. Table 3 below represents an example of 'ProseCommResourcePool'.

'ProseCommResourcePool' included in each list includes 'ProseCommResourceIndexList', and this field represents the index described above. The field that indicates the index may be included in the case that 'ProseCommResourcePool' indicates a transmission pool. In the case that 'ProseCommResourcePool' indicates a reception pool, a network may not include the field ('ProseCommResourceIndexList'), and through this, it is available to decrease the signaling overhead. In the case that 'ProseCommResourcePool' indicates

TABLE 3

```
-- ASN1START
ProseCommPoolList4-r12 ::=         SEQUENCE        (SIZE   (1 .. maxProseTxPool-r12))       OF
ProseCommResourcePool-r12
ProseCommPoolList16-r12 ::=        SEQUENCE        (SIZE   (1 .. maxProseRxPool-r12))       OF
ProseCommResourcePool-r12
ProseCommResourcePool-r12 ::=      SEQUENCE        {
        sc-CP-Len-r12                                       Prose-CP-Len-r12,
        sc-Period-r12              ENUMERATED {sf40, sf60, sf70, sf80, sf120, sf140,
                                               sf160, sf20, sf260, sf280, sf320},
        sc-TF-ResourceConfig-r12                            Prose-TF-ResourceConfig-r12,
        data-CP-Len-r12                                     Prose-CP-Len-r12,
        dataHoppingConfig-r12                       Prose-HoppingConfigComm-r12,
        ue-SelectedResourceConfig                           SEQUENCE {
        -- Parameters not used in case of scheduled Tx config
                data-TF-ResourceConfig              Prose-TF-ResourceConfig-r12,
                trpt-Subset-r12    BIT STRING (SIZE (3 .. 5))            OPTIONAL --
Need OR
        }
                                                    OPTIONAL,       -- Need OR
        rx-ParametersNCell                                  SEQUENCE {
                tdd-Config-r12     TDD-Config       OPTIONAL,            -- Need OR
                sync-ConfigIndex-r12                        INTEGER (0 .. 15)
        }
                                                    OPTIONAL,   -- Need OR
        tx-Parameters                                       SEQUENCE {
                sc-TxParameters-r12                                 Prose-TxParameters-r12,
                dataTxParameters-r12                        Prose-TxParameters-r12
        }
                                                    OPTIONAL,       -- Need OR
        ProseCommResourceIndexList
        ...
}
Prose-CP-Len-r12 ::=               ENUMERATED {normal, extended}
Prose-HoppingConfigComm-r12 ::=    SEQUENCE        {
        hoppingParameter-r12                                INTEGER (0..504),
        numSubbands-r12                             ENUMERATED {ns1, ns2, ns4},
        rb-Offset-r12                                           INTEGER (0..110)
}
-- ASN1STOP
```

In Table 3, 'ProseCommPoolList4' is the list that may include 'ProseCommResourcePool' as much as the number of 'maxProseTxPool', and defines the resources for a signal transmission with respect to the D2D communication. 'ProseCommPoolList16' is the list that may include 'ProseCommResourcePool' as much as the number of 'maxProseRxPool', and defines the resources for a reception signal with respect to the D2D communication.

a reception pool, in order necessarily to monitor a pool of a specific priority, a UE is available to indicate the pool of a specific priority through the field ('ProseCommResourceIndexList').

UE 1 selects a specific resource pool based on a priority of the UE aspect and a priority of the resource pool (step, S152).

The priority of the UE aspect may be the group priority of a group to which the UE is belonged, the priority of a D2D data that the UE is going to transmit, the priority of a target UE/target UE group to which the UE is going to transmit a D2D data, and so on. In the case that UE 1 is going to transmit a D2D data to UE 2, UE 2 is the target UE in the aspect of UE 1. The target UE may be also called a destination UE.

UE 1 transmits the D2D data using the selected resource pool to UE 2 (step, S153).

Hereinafter, steps, S151 to S153 will be described in more detail.

A UE may be belonged to one or more groups. Each group may have its own priority (this is referred to as a group priority). For example, group 1 may have group priority N, group 2 may have group priority M, and group 3 may have group priority L (N, M and L are natural numbers).

Assuming that a network knows to which group each UE is belonged or the priority of the corresponding group, in the case that the network provides a plurality of D2D transmission resource pools through the system information (e.g., SIB 18), one of the method for the D2D communication in relation to different group priories is to use the D2D transmission resource pool which is allowed to the corresponding group priority. For example, in the case that the UE included in group 1 (group priority N) is going to perform the D2D communication, the UE is to use the specific D2D transmission resource pool allowed to the group priority N among a plurality of D2D transmission resource pools. This may be called the prioritization of resource pools based on the group priority.

Through the prioritization of resource pools based on the group priority, more important D2D communication may use the resource pool of higher priority. Generally describing, the D2D communication quality may be improved by selecting the resource pool in relation to the corresponding priority based on the priority of the data that is going to be transmitted.

The network may indicate the related priority for each resource pool to the UE. For example, by providing one or more indices for each resource pool, the priority in relation to the resource pool may be indicated. Or, in the case that it is available to divide one resource pool into more detailed sub resource pools, an index may be provided for each sub resource pool.

When the UE is going to perform the D2D transmission, it is required to select a proper resource that may be used by the UE itself. In the present invention, as described above, a specific resource pool is selected based on the priority of the UE aspect (e.g., the priority of the D2D data transmission that the UE is going to transmit) and the priority of the resource pool.

There are various methods that may be used when a UE selects a specific resource pool, and the following methods may be considered.

1. Only the priority of UE is considered.

That is, a method for selecting a resource pool considering only the priority of UE or the group priority of the UE group to which UE is belonged.

2. A method considering the priority of a destination UE or a destination UE group of the corresponding D2D communication transmission.

In the case that UE 1 transmits data through the D2D communication to UE 2, the UE group to which UE 2 is belonged is the destination UE group. UE 1 may select a resource pool according to the group priority of UE 2.

3. A method for selecting a resource pool considering the priority of data transmitted by a UE When the priority of the data transmitted by a UE is known, the UE selects the resource pool allowed to transmit the data of the corresponding priority. For example, when there are the general data that a UE is going to transmit to another UE using the D2D communication and the D2D data that a UE performing a public safety operation in an emergency situation such as disasters is going to transmit to another UE using the D2D communication, higher priority is allocated to the D2D data that the UE performing the public safety operation transmits and the D2D data is transmitted using the higher priority. By transmitting the D2D data using the resource pool of the higher priority for the data of high priority among the data that the UE performing the public safety operation transmits, the transmission reliability of the data of high priority is to be increased.

4. A method considering the priority of a UE together with the priority of a destination UE/the priority of a destination UE group For example, the higher priority may be considered between the priority of a UE that transmits the D2D data and the priority of a destination UE group that receives the D2D data, or the higher priority may be considered between the priority of a group to which the UE that transmits the D2D data and the priority of a destination UE group that receives the D2D data. Or, in the case that the D2D data that is going to be transmitted by a UE is the data in which the data of different priorities are multiplexed, the highest priority may be considered as the priority of the D2D data that the UE is going to transmit. As a generalization, in the case that a plurality of priorities is related to the corresponding D2D data transmission, the highest priority may be considered.

The UE may compare the higher priority between the priority of the UE and the priority of the destination UE group with the priority of the resource pool, and may determine whether to use the resource pool.

The D2D transmission of the D2D data that has a specific priority in the aspect of the D2D transmission data may be transmitted using the transmission resource pools that have the same priority as the specific priority among the priorities in the aspect of the transmission resource. This method may be applied to the case that a network configures the resource pool available to be used for all priorities that may occur from the UE.

As another method, the D2D transmission belonged to a specific priority may use the D2D transmission resource pool in relation to the same or lower priority. That is, when a UE performs the D2D transmission that has a specific priority, the UE may not use the D2D transmission resource pool which is determined to be used for the D2D transmission of the priority higher than the specific priority.

In the case that there are multiple D2D transmission resource pools that may be used for the D2D transmission through the priority comparison, the UE may select one of them arbitrarily.

Meanwhile, in the case that the priority information is not provided for the D2D transmission resource pool, the restriction in relation to the priority is not applied. That is, the D2D transmission belonged to an arbitrary priority may use the corresponding resource pool.

The network may configure in which way the UE selects a specific resource pool. The configuration may be provided through a broadcasted signal or a UE-specific dedicated signal.

In addition, the network may configure the UE to apply a certain priority in order to select a specific resource pool. For example, the network may configure the UE to select a specific resource pool based on a priority between the priority the UE and the priority of the destination UE group through the flag representing that the priority of the UE is used and the flag representing that the priority of the destination UE group is used. In the case of configuring the UE to select a specific resource pool based on the priority the UE, specifically, the network may configure the UE to select a resource pool based on a priority among the priority the UE/the priority of UE group and the priority of the UE data. The network may configure it through a broadcast signal or a UE-specific dedicated signal.

The priority of the group to which a UE is belonged may be configured by a NAS signal or an Open Mobile Alliance Device Management (OMA DM). The group priority of potential groups may be known to a BS. The group priority may be used when a network set a priority to UE groups. When a network is going to set a priority to the communication in relation to relatively high priority, the group priority may be used. The group priority may be used by a UE or a network. A UE may perform the D2D transmission for a specific group. A UE may perform the D2D transmission for a plurality of groups.

Hereinafter, the particular examples of step, S152 shown in FIG. 15, that is, selecting a specific resource pool will be described based on the priority of the UE aspect and the priority of the resource pool.

<Method 1-1>

As described above, the priority information of each resource pool may be provided in an index form. In the case that the index indicates the priority of the UE group to which the use of a specific resource pool is allowed, the index may indicate the group priority used for determining the UEs of one or more groups that may use the corresponding resource pool. In the case that the index indicates the priority of the data that a UE is allowed to use, the index may indicate one or more priorities of data for using the corresponding resource pool.

As a first method for the D2D transmission belonged to a specific priority to select a transmission resource pool, the D2D transmission belonged to a specific priority may be transmitted using the transmission resource pool in relation to the same priority.

As another method, in the case that the priority of the D2D transmission is higher than or equal to the priority indicated by the index of the resource pool, the corresponding D2D transmission is allowed to use the resource pool. That is, the D2D transmission of which priority is higher than or equal to the priority indicated by the index of a specific resource pool is allowed to use the specific resource pool. In the case that the priority of the D2D transmission is lower than the priority of the index of a specific resource pool, the UEs belonged to the UE group are not allowed to use the specific resource pool.

As still another method, in the case that the priority of the D2D transmission is lower than or equal to the index of the resource pool, the corresponding D2D transmission is allowed to use the resource pool. That is, the D2D transmission of which priority is lower than or equal to the priority indicated by the index of a specific resource pool is allowed to use the specific resource pool.

Figure 16:
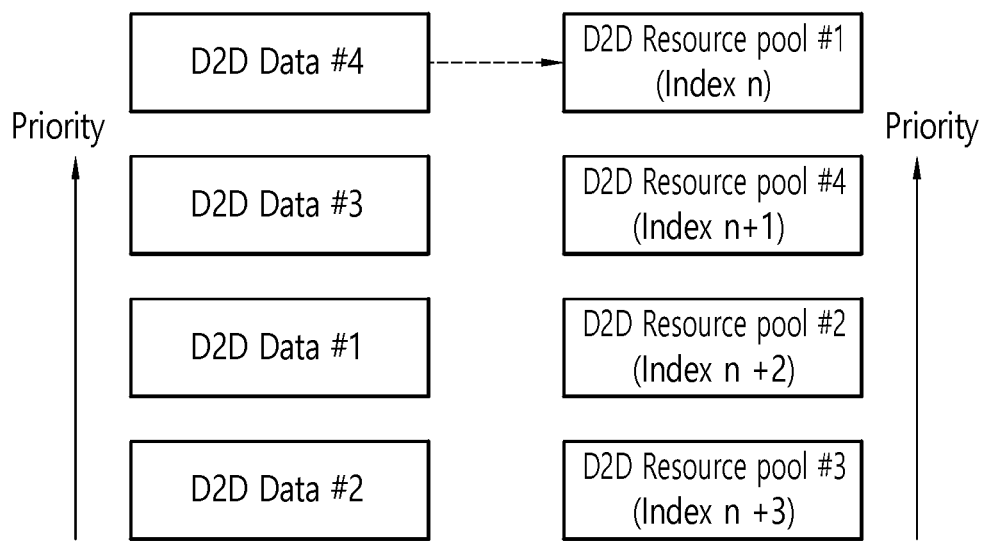
FIG. 16 illustrates an example of a method for selecting a specific resource pool considering the priority indicated by an index of a resource pool and the priority of a UE aspect.

FIG. 16 illustrates an example of a method for selecting a specific resource pool considering the priority indicated by an index of a resource pool and the priority of a UE aspect.

Referring to FIG. 16, a UE has D2D data #1, #2, #3 and #4 to transmit and the priority increases in the order of #4, #3, #1 and #2. For example, D2D data #4 is the D2D data for the public safety and has the highest priority, and D2D data #2 is the normal data between UEs and has the lowest priority.

A network provides D2D resource pool #1, #2, #3 and #4 and index n may be provided for D2D resource pool #1, index n+1 may be provided for D2D resource pool #4, index n+2 may be provided for D2D resource pool #2, and index n+3 may be provided for D2D resource pool #3. Assuming that the priority is higher as the index is lowered, the priority is higher in the order of #1, #4, #2 and #3. The priority may be set higher as the probability of interference is lower and the channel quality is higher in the D2D resource pool. In such a case, the UE may transmit D2D data #4 that has the highest priority through D2D resource pool #1 that has the highest priority.

Meanwhile, in the case that the index of the resource pool is not provided for a specific resource pool, the D2D transmission that has an arbitrary priority may be allowed to use the corresponding resource pool. Or, only the UEs belonged to a specific group or a specific priority or the D2D transmission that has a specific priority may be allowed to use the corresponding resource pool. For this, the UE may receive a configuration on a certain group to use the corresponding resource pool through an OMA DM or a NAS signal.

<Method 1-2>

A network may provide a plurality of indices for each resource pool, not provide only a single index for each resource pool. In the case that a plurality of indices is provided, a plurality of priorities of the D2D transmission that may use the corresponding resource pool may be determined. For example, a plurality of UE groups that may use a specific resource pool may be determined, or a plurality of priorities of the data that may use the corresponding resource pool may be determined.

The D2D transmission corresponds to a specific priority may be transmitted using the transmission resource pool in relation to the same priority.

Or, in the case that an index of a resource pool is provided by a network, in the case that the priority of the D2D transmission is higher than or equal to the index of the resource pool, the corresponding D2D transmission is allowed to use the resource pool. On the contrary, in the case that the priority of the D2D transmission is lower than the index of the resource pool, the corresponding D2D transmission is not allowed to use the resource pool.

In the case that the index of the resource pool is not provided for a specific resource pool, the UE may operate as follows. First, the D2D transmission that has an arbitrary priority may be allowed to use the corresponding resource pool. That is, without any specific restriction, the D2D transmission that has an arbitrary priority may use the corresponding resource pool. Or, only the D2D transmission that has a specific priority may be allowed to use the corresponding resource pool. In the case of operating to use the corresponding resource pool by limiting a UE group, the UE may receive a configuration on a certain group to use the corresponding resource pool through an OMA DM or a NAS signal.

<Method 1-3>

Instead of providing a single index for each resource pool, a network may provide an index of each resource pool as a value within a specific range. The range of the index may indicate the range of one or more priorities that may use the corresponding resource pool.

In the case that the index is provided in a predetermined range, not as a specific value, by a network, when the priority of the D2D transmission is within the range, the D2D transmission is allowed to use the resource pool. Otherwise, the D2D transmission is unable to use the resource pool.

In the case that the index of a specific resource pool is not provided, the D2D transmission that has an arbitrary priority may be allowed to use the corresponding resource pool. Or, only the UE belonged to a specific group may use the corresponding resource pool. For this, the UE may receive a configuration on the data of a certain priority or a certain group to use the corresponding resource pool through an OMA DM or a NAS signal.

<Method 2>

An index of each resource pool provided by a network may represent a class of a resource pool. The class of a resource pool may be used for determining a UE of a certain access class or a UE group to use the corresponding resource pool.

For example, the class of a resource pool may be divided into two. That is, the class may be divided into two such as a high class and a normal class. The high class may indicate that the resource pool may be used by the UE that has high access class only. The normal class may indicate that the resource pool may be used by both of the UE that has the high access class and the UE that has the normal access class.

Figure 17:
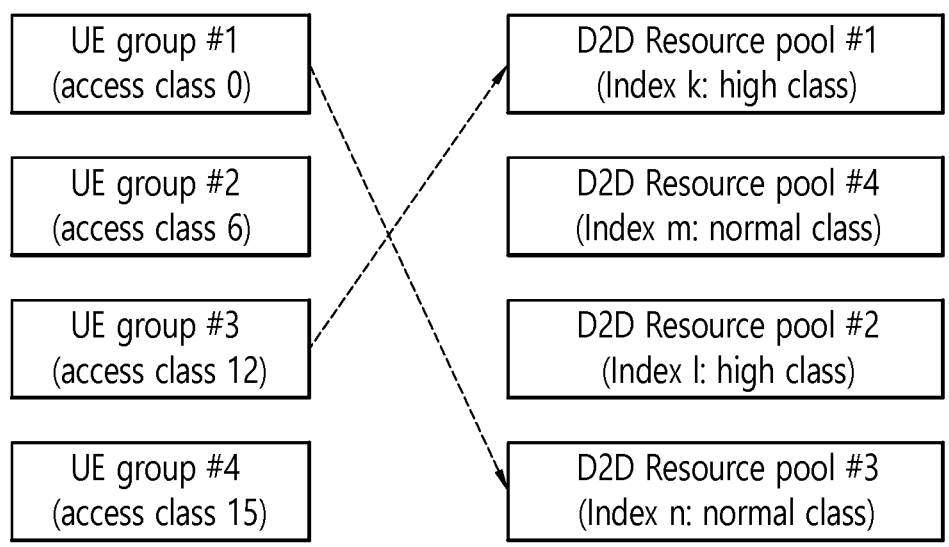
FIG. 17 illustrates an example of a method for selecting a specific resource pool considering the class indicated by an index of a resource pool and the access class which is the priority of a UE aspect.

FIG. 17 illustrates an example of a method for selecting a specific resource pool considering the class indicated by an index of a resource pool and the access class which is the priority of a UE aspect.

Referring to FIG. 17, it is assumed that UE group #1 is access class 0 (AC 0), UE group #2 is access class 6 (AC 6), UE group #3 is access class 12 (AC 12), and UE group #4 is access class 15 (AC 15). Access classes 0 to 9 are normal access classes and access classes 11 to 15 are high access classes. In the case that a UE is belonged to access classes 0 to 9, the UE regards the UE itself as the normal access class, and may use the resource pool of the normal class only. On the other hand, in the case that a UE is belonged to access classes 11 to 15, the UE regards the UE itself as the high access class, and may use both of the resource pools of the normal class and the high class, or may use the resource pool of the high class only.

It is assumed that index k representing the high class is given to D2D resource pool #1, index m representing the normal class is given to D2D resource pool #4, index l representing the high class is given to D2D resource pool #2, and index n representing the normal class is given to D2D resource pool #3.

In this case, since the UE belonged to UE group #1 corresponds to access class 0 belonged to the normal access class, the UE may use the resource pools of the normal class among the D2D resource pools, that is, D2D resource pools #3 and #4 only. On the other hand, since the UE belonged to UE group #3 corresponds to access class 12 belonged to the high access class, the UE may use all of the D2D resource pools. FIG. 17 exemplifies the case that UE group #3 uses D2D resource pool #1 that includes the resource pools of the high class.

That is, when a class of a resource pool is provided by an index of a network, in the case that a UE is belonged to the high access class, the UE is allowed to use the resource pool that has the index indicating the high class. The UE belonged to the high access class is also allowed to use the resource pool that has the index indicating the normal class.

Otherwise, when a UE is belonged to the high access class, the UE may use the resource pool that has the index indicating the high class, but may not use the resource pool that has the index indicating the normal class.

When a UE is belonged to the normal class, the UE may use the resource pool that has the index indicating the normal class only. The UE may not be allowed to use the resource pool that has the index indicating the high class.

In the case that an index of a resource pool is not provided, it may be determined that a UE belonged to an arbitrary class may use the resource pool.

In the above example, the class of a resource pool is divided into the high class and the low class, but the class of a resource pool may also be divided into the class for the public safety and the class for the non-public safety. Or, when the class of a resource indicates the high class, it may represent the resource pool that may be used for the public safety, and when the class of a resource indicates the normal class, it may represent the resource pool that may be used for the non-public safety.

In the case that a UE is belonged to the class for the public safety, the UE may be allowed to use the resource pool indicating the high class of which the corresponding index is high among the resource pools or the class for the public safety. The UE may also be allowed to use the resource pool that has the index indicating the non-public safety or the normal class. Or, the UE may use only the resource pool that has the index indicating the high class or the class for the public safety or the normal class, and may not be allowed to use the resource pool that has the index indicating the non-public safety or the normal class.

In the case that a UE is belonged to the class for the non-public safety, the UE may be allowed to use only the resource pool that has the index indicating the normal class or the class for the non-public safety among the resource pools. This UE may not be allowed to use the resource pool that has the index indicating the high class or the class for the public safety.

In the case that an index of a resource pool is not provided, it may be determined that a UE of an arbitrary class may use the resource pool.

<Method 3-1>

The index for each resource pool provided by a network may indicate a threshold of a group priority used for determining a UE or a UE group that may use the corresponding resource pool.

When a UE is going to transmit data to other specific UE or other specific UE group through the D2D operation, it may determined whether to transmit a D2D signal to the other specific UE or the other specific UE group by comparing the priority of the other specific UE or the other specific UE group with the index of the resource pool using the resource pool. In other words, the D2D signal transmission resource pool is determined by comparing the priority of a target UE or a target UE group which is the transmission target of the D2D signal with the index of the resource pool.

As such, in the case that the index of a resource pool is provided by a network, when the priority of the target UE group that is going to transmit data through D2D is higher than or equal to the index of the resource pool, the UE is allowed to use the resource pool for a D2D transmission.

When the priority of the target UE group that is going to transmit data through D2D is lower than the index of the resource pool, the UE is not allowed to use the resource pool for a D2D transmission.

In the case that an index of a resource pool is not provided, it is allowed to use the corresponding resource pool for the D2D transmission for an arbitrary UE group.

<Method 3-2>

A network may provide a plurality of indices, not provide only a single index for each resource pool. Each index may indicate the group priority used for determining a target UE or a target UE group (i.e., a UE or a UE group which is a target of transmitting D2D data) that a UE is going to transmit data through the D2D operation using the corresponding resource pool.

When the priority of the target UE group is higher than or equal to the index of the resource pool, the UE may transmit a D2D signal to the UEs belonged to the target UE group through the D2D operation using the resource pool. Otherwise, the UE may not use the resource pool when transmitting the D2D signal to the UEs belonged to the target UE group.

In the case that an index of a resource pool is not provided, it may be allowed to use the corresponding resource pool for the D2D transmission for an arbitrary UE group.

<Method 3-3>

Instead of providing a single index for each resource pool by a network, each resource pool may provide the values of a predetermined range. Each range may represent the range for applying the priority of a target UE or a target UE group to which a UE transmits a D2D signal according to the D2D operation.

In the case that the priority of the target UE/target UE group to which a UE transmits a D2D signal according to the D2D operation is in the range in which the corresponding resource pool is applicable, the UE may transmit the D2D signal to the target UE/target UE group using the resource pool.

Otherwise, the UE may not transmit the D2D signal to the target UE/target UE group using the resource pool.

In the case that an index of a resource pool is not provided, it may be determined that a UE of an arbitrary group may use the resource pool for transmitting the D2D signal.

In the methods described above, when there is a plurality of resource pools that a UE is available to use, the UE may select an arbitrary resource pool among the plurality of resource pools. Preferably, the UE may select the resource pool that has the highest priority or the highest class.

Figure 18:
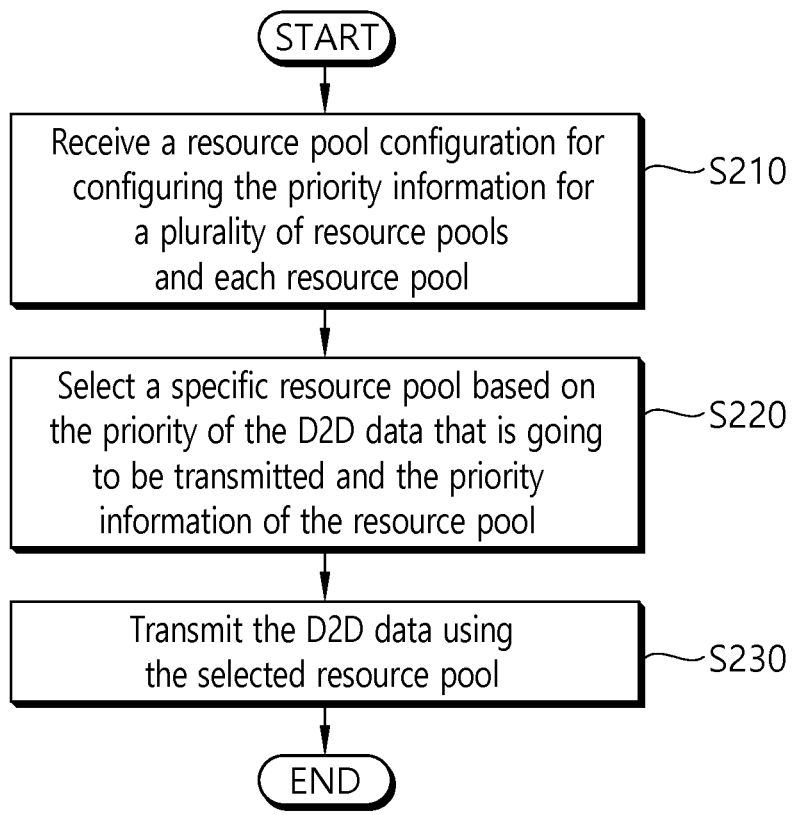
FIG. 18 illustrates a method for transmitting D2D data performed by a UE according to the present invention.

FIG. 18 illustrates a method for transmitting D2D data performed by a UE according to the present invention.

Referring to FIG. 18, a UE receives a resource pool configuration for configuring the priority information for a plurality of resource pools and each resource pool from a network (step, S210). The resource pool configuration is described by referring to Tables 2 and 3 above.

The UE selects a specific resource pool based on the priority of the D2D data that is going to be transmitted and the priority information of the resource pool (step, S220). The method for selecting a specific resource pool is described above.

The UE transmit the D2D data to other UE using the selected resource pool (step, S230).

According to LTE Rel-12 standard, a plurality of D2D transmission resource pools may be configured to a UE for transmitting a D2D signal. However, a restriction is defined that a UE is to use only the first D2D transmission resource pool among a plurality of D2D transmission resource pools for transmitting a D2D signal.

Case 1) In the case that a plurality of D2D transmission resource pools is configured and the priority of each D2D transmission resource pool is provided by a network, when the priority of the data (D2D data) that is going to be transmitted through the D2D operation is indicated, a UE select a specific D2D transmission resource pool by considering the priority of the data and the priority of each D2D transmission resource pool, not considering the restriction of using only the first D2D transmission resource pool, which is provided in the present invention.

Case 2) A plurality of D2D transmission resource pools is configured and the priority of each D2D transmission resource pool is indicated by a network, but the priority of the data (D2D data) that is going to be transmitted through the D2D operation may not be indicated. In this case, a UE may select a specific D2D transmission resource pool, for example, the D2D transmission resource pool that has a specific priority or the first D2D transmission resource pool in the D2D transmission resource pool list. Or, the UE is available to transmit the D2D data by selecting the D2D transmission resource pool that has no related priority.

Case 3) As another case, a plurality of D2D transmission resource pools is configured, but the priority of each D2D transmission resource pool is not indicated and the priority of the D2D data that is going to be transmitted using D2D may be indicated. In this case, a UE gets out of the restriction of using only the first D2D transmission resource pool, and may perform the D2D transmission by using an arbitrary transmission pool.

Figure 19:
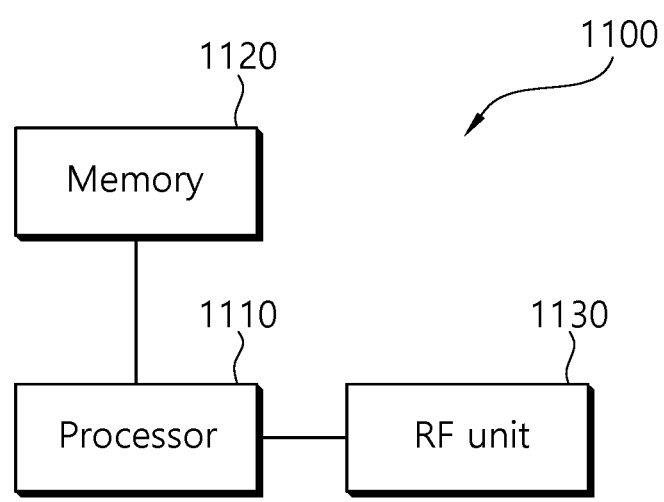
FIG. 19 is a block diagram illustrating a UE in which the embodiments of the present invention are implemented.

FIG. 19 is a block diagram illustrating a UE in which the embodiments of the present invention are implemented.

Referring to FIG. 19, a UE 1100 includes a processor 1110, a memory 1120 and a radio frequency (RF) unit 1130. The processor 1110 implements the proposed functions, processes and/or methods. For example, the processor 1110 receives the resource pool configuration that configures the priority information for a plurality of resource pools and each resource pool, and selects a specific resource pool for transmitting the D2D data among the plurality of resource pools based on the priority information for each resource pool.

The RF unit 1130 is connected with the processor 1110, and transmits and receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

What is claimed is:

1. A method for transmitting device-to-device (D2D) data in a wireless communication system, the method performed by a user equipment (UE) and comprising:

receiving, from a network, information for a plurality of resource pools and class information for each of the plurality of resource pools; and transmitting, to another UE, the D2D data on a specific resource pool related to a public safety class among the plurality of resource pools based on the class information, when the UE is a UE related to the public safety class, wherein the class information is information related to whether the each of the plurality of resource pools is the public safety class or a non-public safety class.

2. The method of claim 1, wherein, when the D2D data comprises a plurality of packets, at least two packets among the plurality of packets have different D2D data priorities.

3. The method of claim 1, wherein when the UE is a UE related to the non-public safety class, the UE transmits the D2D data on a specific resource pool related to the non-public safety class among the plurality of resource pools based on the class information.

4. A user equipment (UE), comprising:

a transceiver configured to transmit and receive a radio signal; and a processor operatively connected to the transceiver, that:

controls the transceiver to receive, from a network, information for a plurality of resource pools and class information for each of the plurality of resource pools, and controls the transceiver to transmit, to another UE, device-to-device (D2D) data on a specific resource pool related to a public safety class among the plurality of resource pools based on the class information, when the UE is a UE related to the public safety class, wherein the class information is information related to whether the each of the plurality of resource pools is the public safety class or a non-public safety class.

5. The UE of claim 4, wherein, when the D2D data comprises a plurality of packets, at least two packets among the plurality of packets have different D2D data priorities.

6. The UE of claim 5, wherein when the UE is a UE related to the non-public safety class, the UE transmits the D2D data on a specific resource pool related to the non-public safety class among the plurality of resource pools based on the class information.

* * * * *